United States Patent
Greenspan et al.

(10) Patent No.: US 10,055,360 B2
(45) Date of Patent: Aug. 21, 2018

(54) APPARATUS AND METHOD FOR SHARED LEAST RECENTLY USED (LRU) POLICY BETWEEN MULTIPLE CACHE LEVELS

(71) Applicant: Intel Corporation, Santa Clara, CA (US)

(72) Inventors: Daniel Greenspan, Jerusalem (IL); Blaise Fanning, Folsom, CA (US); Yoav Lossin, Jerusalem (IL); Asaf Rubinstein, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 34 days.

(21) Appl. No.: 14/975,752

(22) Filed: Dec. 19, 2015

(65) Prior Publication Data

US 2017/0177502 A1    Jun. 22, 2017

(51) Int. Cl.
*G06F 12/00* (2006.01)
*G06F 12/123* (2016.01)
(Continued)

(52) U.S. Cl.
CPC ........ *G06F 12/123* (2013.01); *G06F 12/0891* (2013.01); *G06F 12/0897* (2013.01);
(Continued)

(58) Field of Classification Search
CPC .............. G06F 12/123; G06F 12/0891; G06F 12/0864; G06F 12/0897; G06F 2212/60; G06F 2212/69
(Continued)

(56) References Cited

U.S. PATENT DOCUMENTS 6,148,372 A  *  11/2000  Mehrotra ............ G06F 12/0897
                                                    711/122
6,237,064 B1 *  5/2001  Kumar ................ G06F 12/0884
                                                    711/122
(Continued)

OTHER PUBLICATIONS

International Search Report and Written Opinion for Application No. PCT/US2016/061306, dated Mar. 6, 2017, 11 pages.
(Continued)

*Primary Examiner* — Mark Giardino, Jr.
*Assistant Examiner* — Tasnima Matin
(74) *Attorney, Agent, or Firm* — Nicholson De Vos Webster & Elliott LLP

(57) ABSTRACT

A method and apparatus are described for a shared LRU policy between cache levels. For example, one embodiment of the invention comprises: a level N cache to store a first plurality of entries; a level N+1 cache to store a second plurality of entries; the level N+1 cache to initially be provided with responsibility for implementing a least recently used (LRU) eviction policy for a first entry until receipt of a request for the first entry from the level N cache at which time the entry is copied from the level N+1 cache to the level N cache, the level N cache to then be provided with responsibility for implementing the LRU policy until the first entry is evicted from the level N cache, wherein upon being notified that the first entry has been evicted from the level N cache, the level N+1 cache to resume responsibility for implementing the LRU eviction policy with respect to the first entry.

25 Claims, 13 Drawing Sheets

(51) Int. Cl.
*G06F 12/0891* (2016.01)
*G06F 12/0897* (2016.01)

(52) U.S. Cl.
CPC .............. *G06F 2212/1016* (2013.01); *G06F 2212/1028* (2013.01); *G06F 2212/60* (2013.01); *Y02D 10/13* (2018.01)

(58) Field of Classification Search
USPC ........................................................ 711/122
See application file for complete search history.

(56) References Cited

U.S. PATENT DOCUMENTS

| | | |
|---|---|---|
| 7,640,399 B1 | 12/2009 | Lepak et al. |
| 2003/0204677 A1* | 10/2003 | Bergsten ............. G06F 12/0866 711/144 |
| 2004/0083341 A1* | 4/2004 | Robinson .............. G06F 12/126 711/133 |
| 2009/0024800 A1 | 1/2009 | Flemming et al. |
| 2012/0159073 A1* | 6/2012 | Jaleel .................. G06F 12/0813 711/122 |
| 2013/0086326 A1 | 4/2013 | Revanuru |
| 2013/0111139 A1 | 5/2013 | Balakrishnan et al. |
| 2014/0115261 A1 | 4/2014 | Maybee et al. |
| 2016/0055100 A1* | 2/2016 | Loh ....................... G06F 12/128 711/122 |

OTHER PUBLICATIONS

International Preliminary Report on Patentability for Application No. PCT/US2016/061306 dated Jun. 28, 2018, 8 pages.

\* cited by examiner

APPARATUS AND METHOD FOR SHARED LEAST RECENTLY USED (LRU) POLICY BETWEEN MULTIPLE CACHE LEVELS

BACKGROUND

Field of the Invention

This invention relates generally to the field of computer processors and software. More particularly, the invention relates to an apparatus and method for a shared LRU policy between multiple cache levels.

Description of the Related Art

One reason that hierarchical caches are used is to enable the use of small caches that are closer to the processor (e.g., such as the Level 1 cache (L1)) to handle requests at a faster rate than subsequent larger levels of the cache hierarchy (e.g., such as the Level 2 (L2)). It is therefore impractical to advise the L2 cache of accesses served in the L1 cache, as these accesses are occurring at a faster rate than the L2 cache can handle. Generalizing, this principle occurs between any two levels in a cache hierarchy (e.g., adjacent cache levels Ln and L(n+1) such as described below).

This leads to a difficulty for the Least Recently Used (LRU) mechanism of the L2 cache. The L2 cache is are not aware of processor access to data at addresses held in the L1 cache, and in cases where the L1 cache consistently hits certain addresses, the L2 cache will not see any requests to those addresses. Thus, data that is most frequently accessed by the processor is actually most likely to be evicted from the L2 and lower levels of cache. If subsequently, the data is momentarily evicted from the L1 cache, any later attempt to use it will result in the penalty of a fetch from main memory.

A common way of solving this problem is the make the L1 cache somewhat "leaky"—for example, by occasionally evicting the most-recently-used (MRU) entry or by sending a small proportion of requests to the L1 cache down to the L2 cache even though the L1 has serviced them.

Another approach is to operate the caches in a form of "exclusive mode," for example, that all data in the L1 cache is automatically removed from the L2 cache. Likewise, when data is evicted (even unmodified) from the L1 cache, it is returned to the L2 cache as MRU data.

The same problem applies in certain implementations of a single cache controller, such as those in which all cache data is held in dynamic random access memory (DRAM), but only a proportion of the cache Metadata (Tags, valid indications, LRU indications, etc) are held on-die (with the remaining Metadata also residing in DRAM). It is possible to consider this arrangement as the same as two levels of cache (e.g., with a 1:4 capacity ratio and a 2:1 speed ratio). The problem remains that it is impractical from a power and bandwidth basis to update LRU details (for example, to mark the accessed entry as most recently used and to age the LRU of non-accessed entries of the same Set) in the DRAM-held Metadata (i.e., the L2) when accesses are served from on-die Metadata (i.e., the L1). The close (e.g., 1:4) capacity ratio of the two cache levels also causes a problem; it can reasonably expected that some workloads will fit entirely within the on-die Metadata, which can result in their DRAM Metadata rapidly reaching a least recently used status (e.g., assigned the highest LRU value among entries in the Set and therefore becoming eligible for eviction).

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
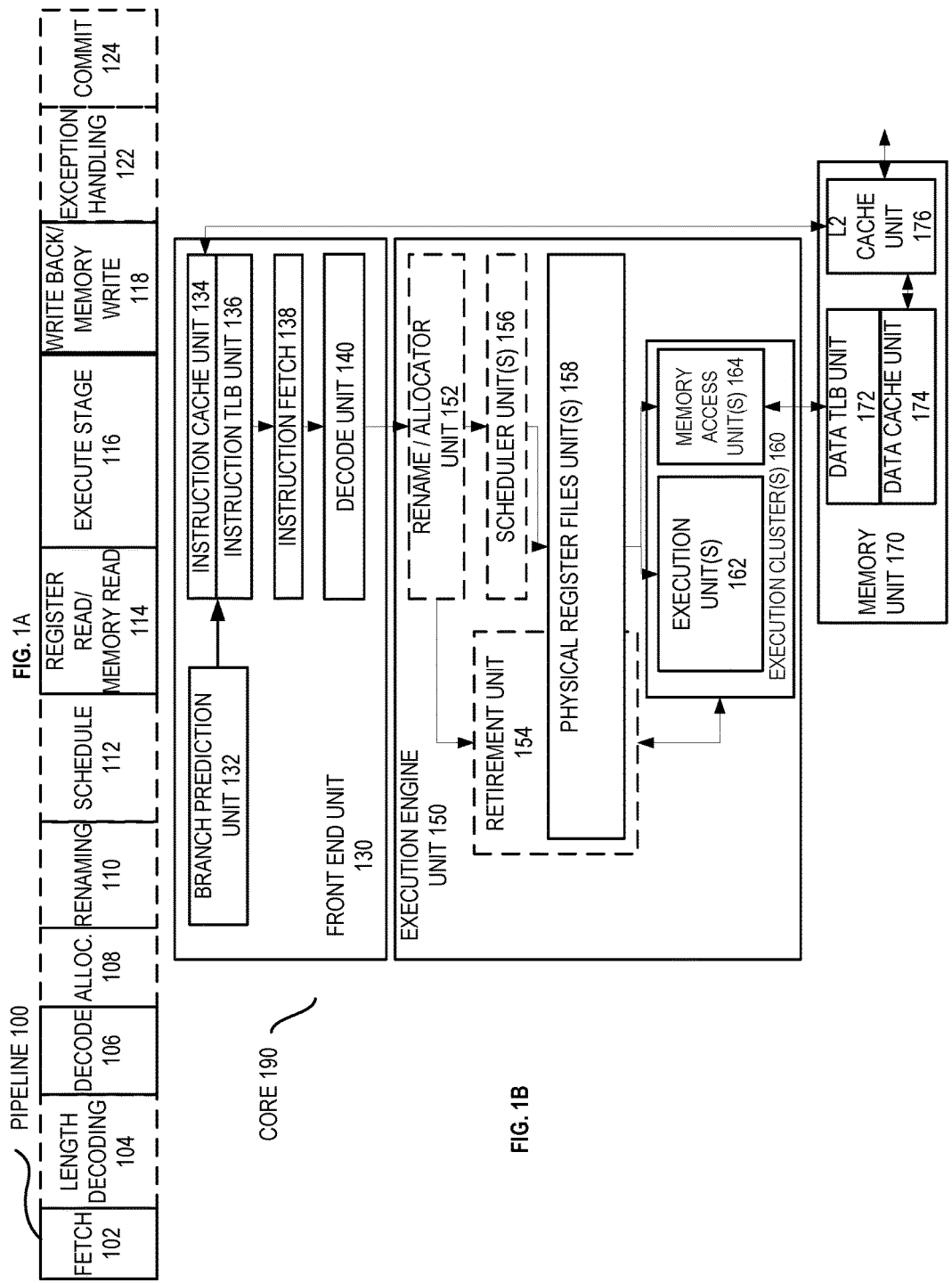
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/ execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
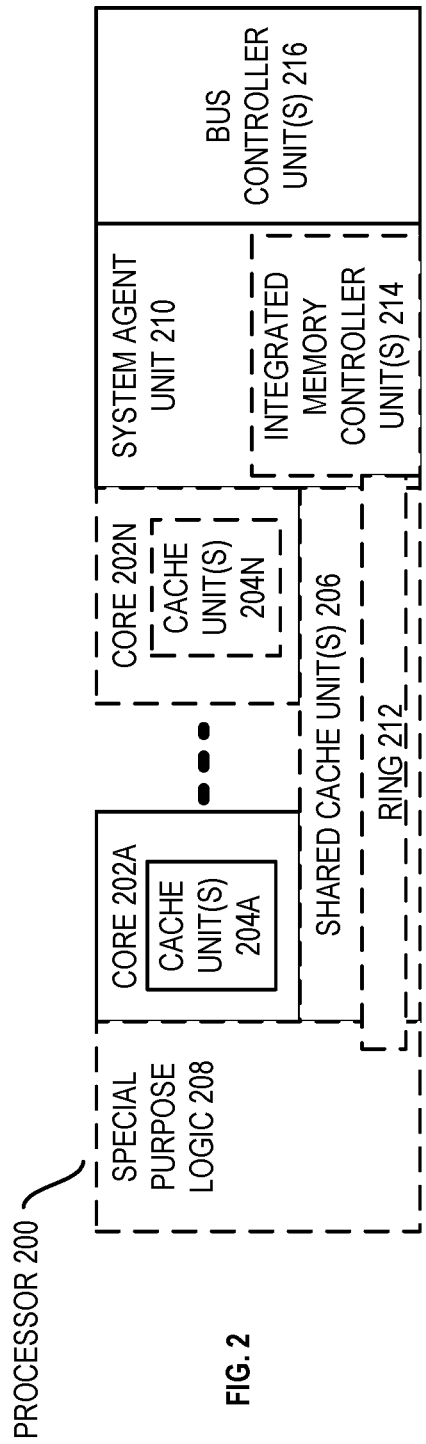
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

It will be obvious that in the case of an L2 cache servicing multiple L1 caches, the scheme may be extended, for example, by assigning multiple "Super MRU" values for the L2 cache to indicate that the LRU of the entry is being tracked by specific L1 caches or combinations of L1 caches.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, tablets, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
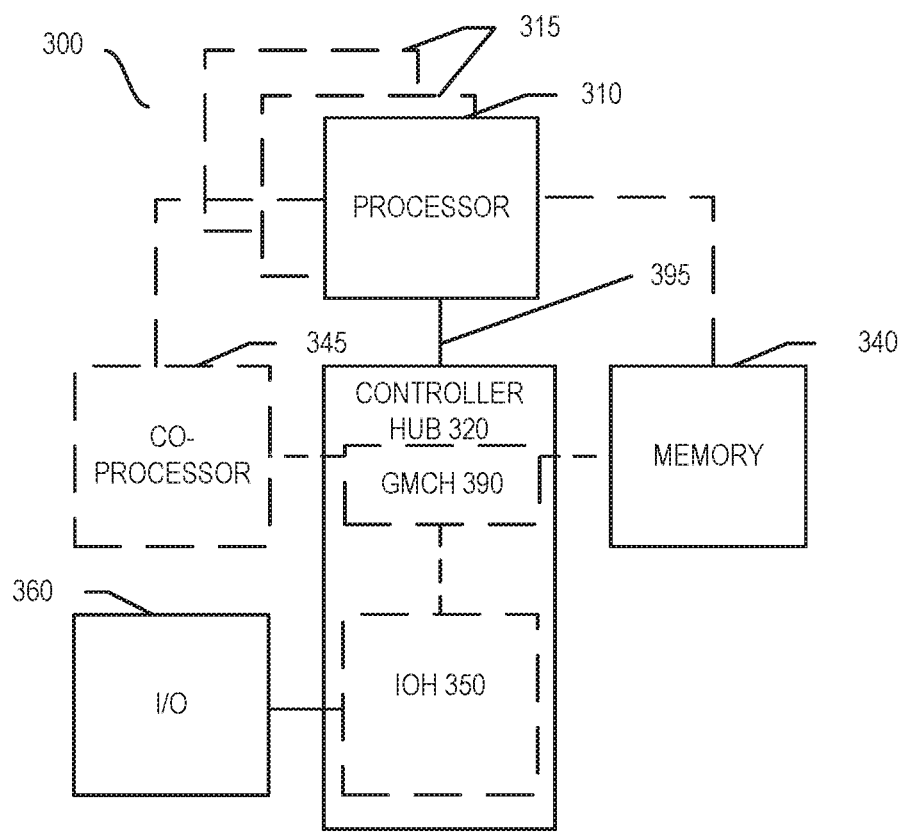
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 is a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
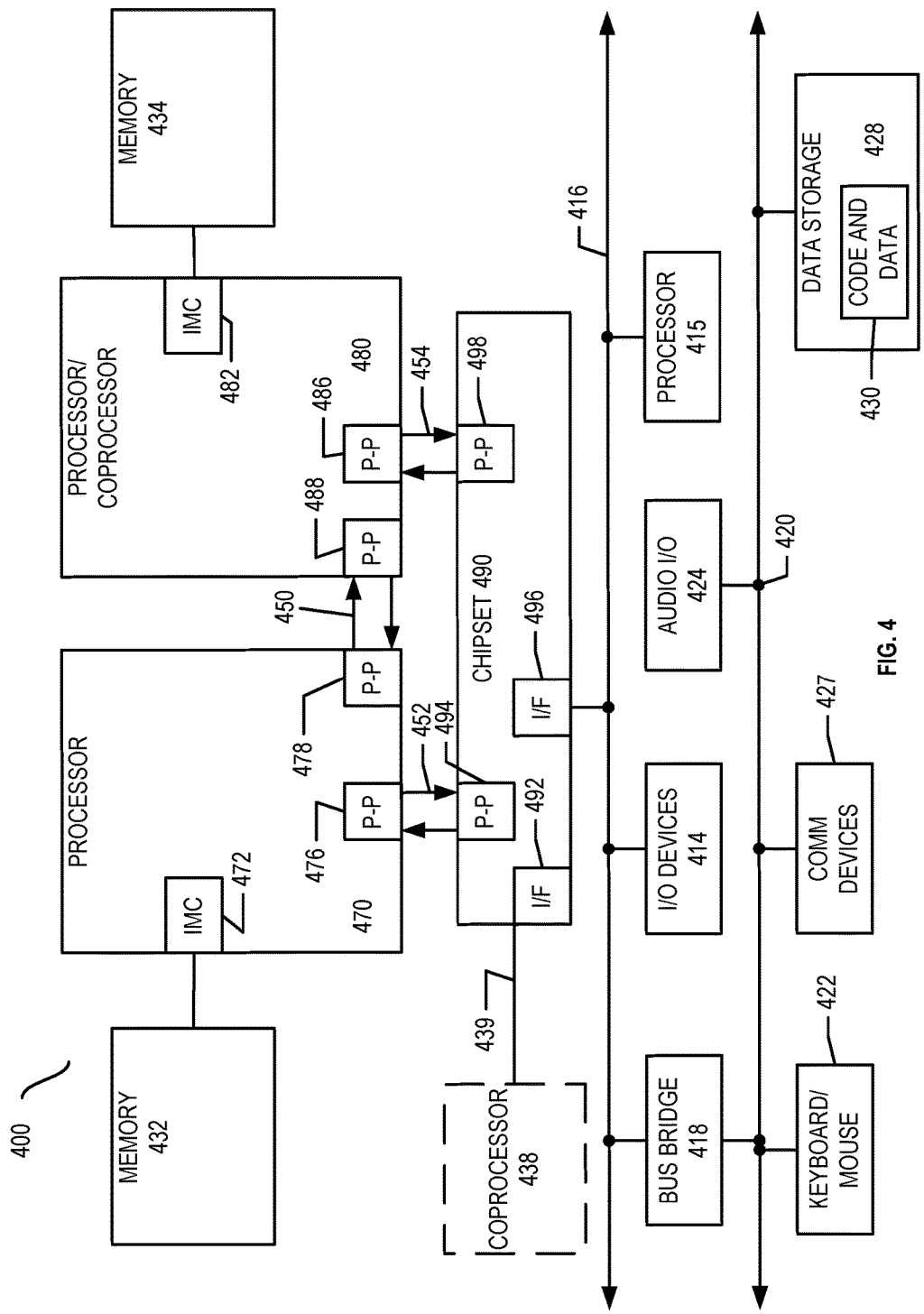
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
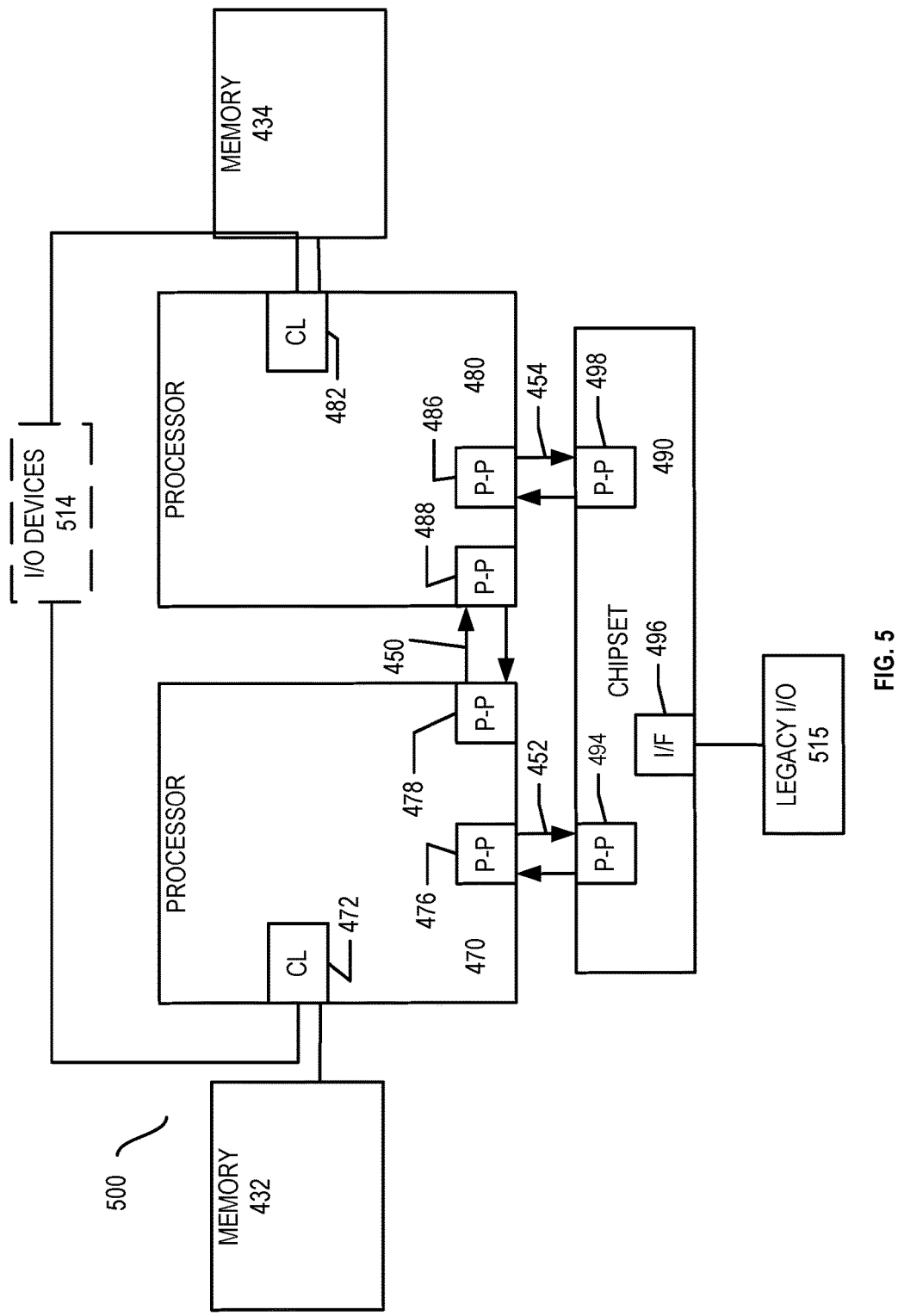
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
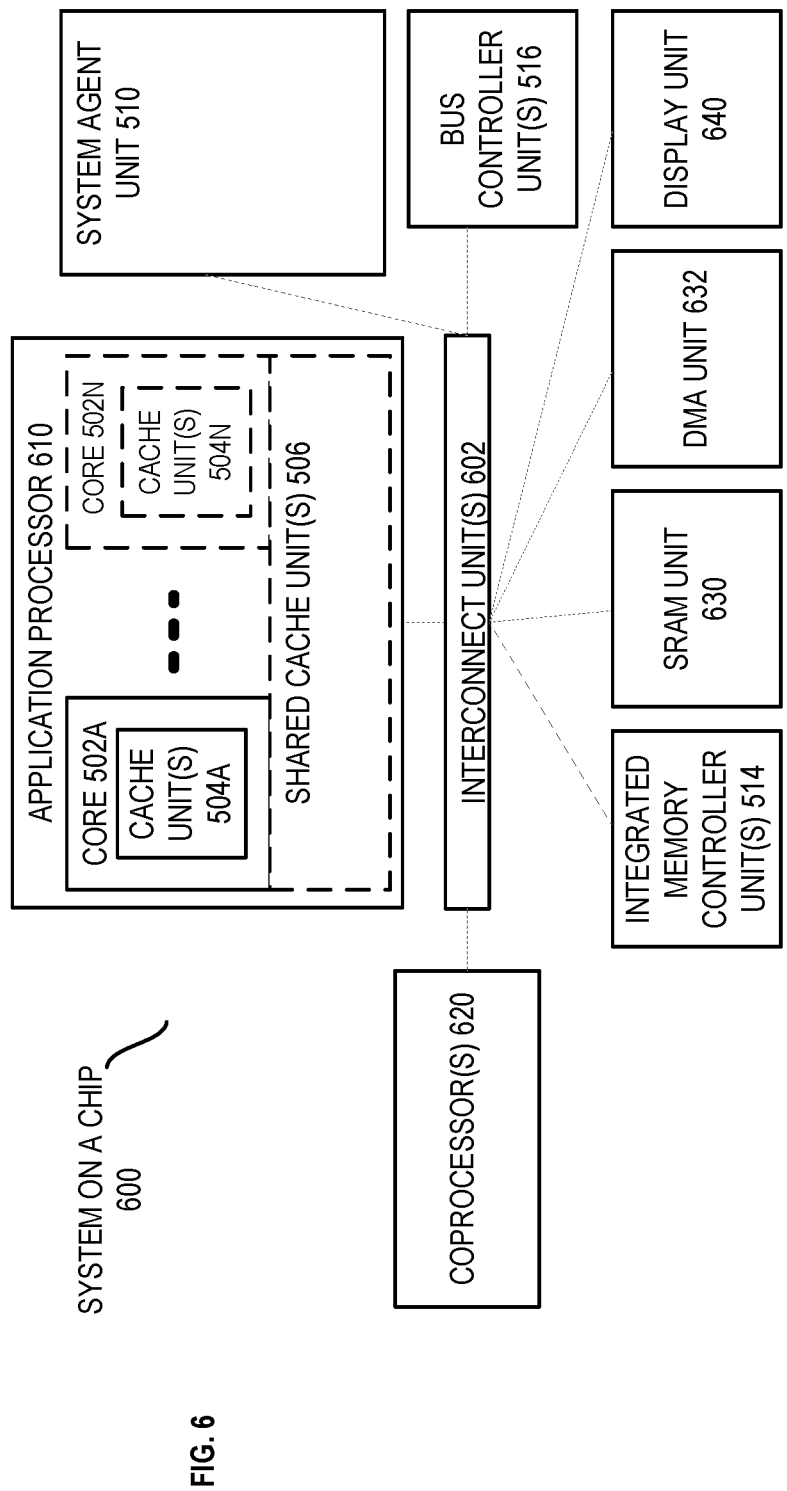
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
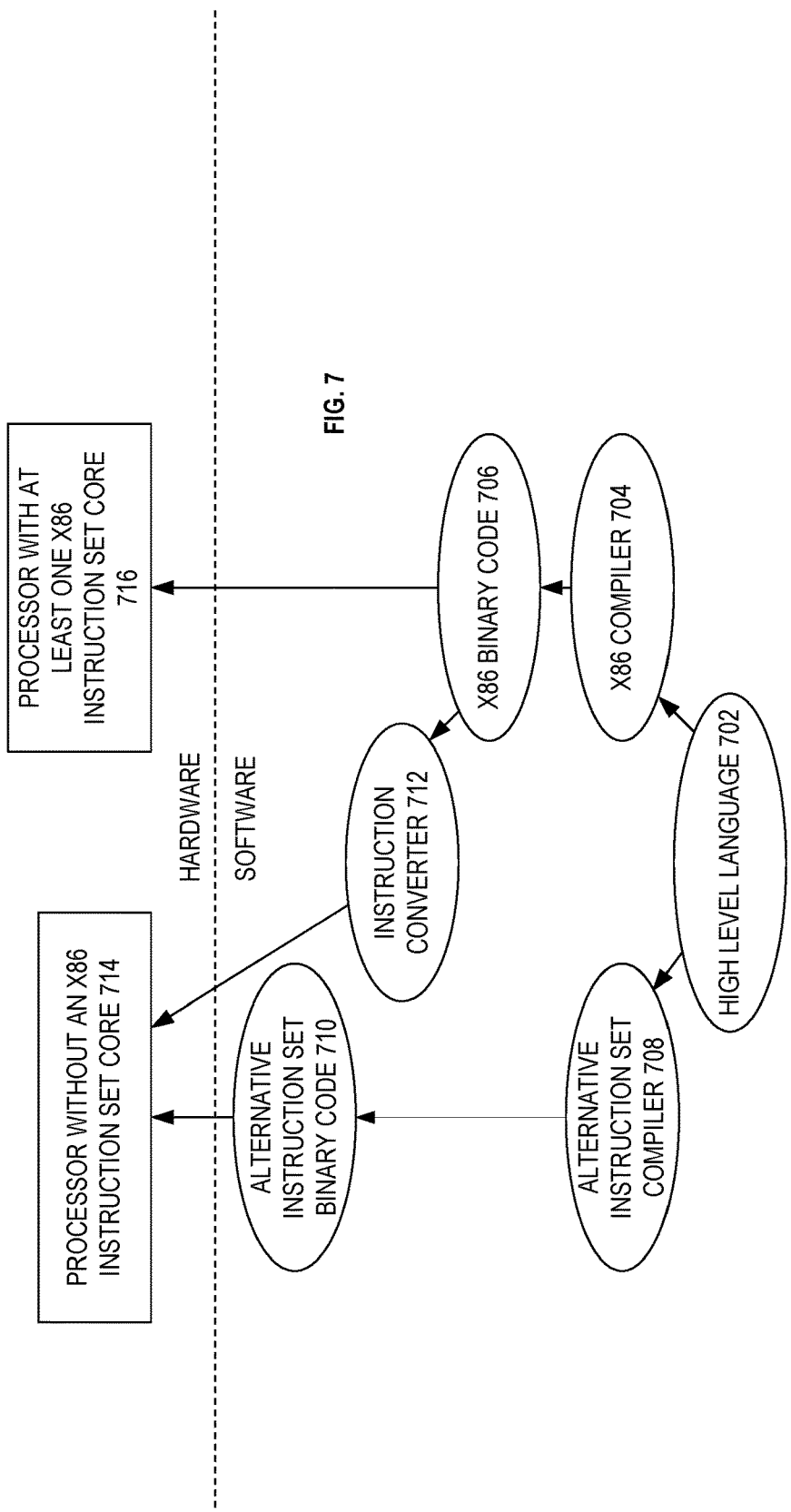
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Shared Least Recently Used (LRU) Policy Between Multiple Cache Levels The embodiments of the invention described below remove the independence between the LRU mechanisms of different cache levels and allow for the creation of an improved least recently used (LRU) tracking of processor requests. In certain use cases, where the penalty of an improper eviction of L2 data to main memory is high latency, these embodiments provide improved L2 cache hit rates and avoid glass-jaw effects in applications where certain code is periodically accessed intensively by the processor.

In one embodiment, if the L1 cache evicts according to its own LRU tracking policy, any entry evicted from the L1 cache may be marked as a most recently used (MRU) entry in the L2 cache (e.g., set to an LRU value of 1 as discussed below). In addition, no new entry is allocated in the L1 cache without it having been requested from the L2 cache. Using these principles, LRU ownership of the L2 cache may be managed by considering entries held in the L1 cache as the "Super Most Recently Used" entries of the L2 cache (e.g., set to an LRU value of 0 as described below). When it is determined that an entry has been evicted from the L1 cache, it may initially be set to an LRU value of 1 (i.e., Most Recently Used) and start aging in the L2 cache. Thus, the L2 cache tracks the true order of "least recently used" by the processor because the order in which entries get evicted from the L1 cache and start aging in the L2 cache is a direct function of the LRU mechanism of the L1 cache.

In a scenario where L1 and L2 caches are set-associative with the same number of sets (but the L2 more associative than the L1), one way of keeping the L2 cache informed of which entries are in the L1 cache is by the L2 cache providing an L2_WAY number (for the L2 Set) whenever delivering data to the L1 cache and by the L1 cache providing a vector indicating present L2 WAYS (for that Set) whenever requesting new data from the L2 cache.

Some embodiments of the invention utilize N-Way Set associative caches in which each cache is subdivided into "Sets" each having N "Ways." In these embodiments, each Set is associated with a particular range of system memory address space such that cache lines from a particular region of system memory may be stored in only one of the Sets. In an N-Way Set associative cache, each Set can store N cache lines.

Figure 8:
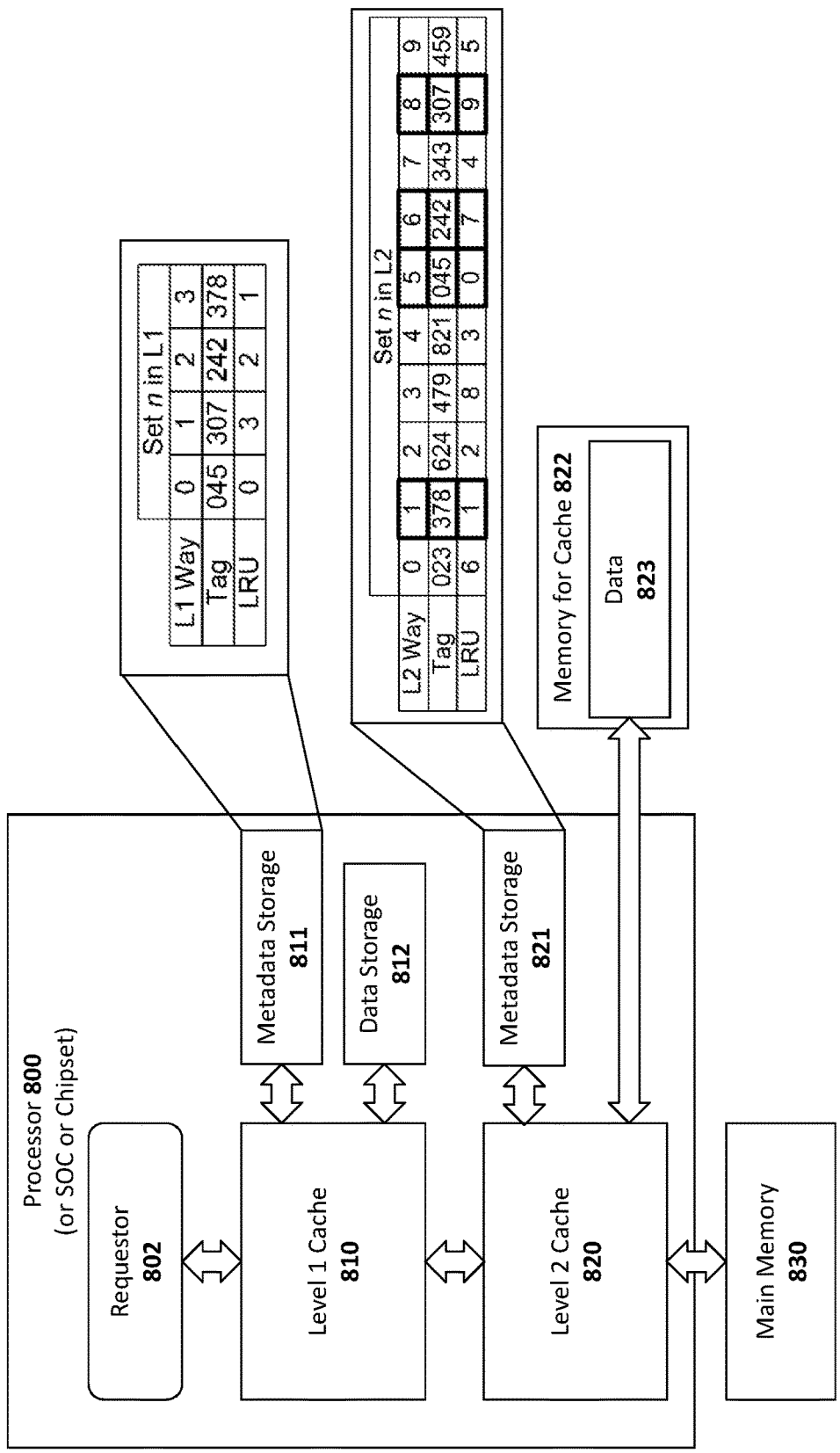
FIG. 8 illustrates pertinent elements of one embodiment of a processor architecture.

FIG. 8 shows a typical arrangement of a processor 800 with two levels of cache within a hierarchy—an L1 cache 810 and an L2 cache 820. In this example, both cache levels 810, 820 are Set-associative. The L1 cache 810 is small and fast, storing both Metadata 811 (e.g., tag, valid bits, dirty indications, LRU indicators, etc.) and the actual data 812 on-die. The L2 cache 820 is larger and slower, and only holds the Metadata 821 on-die, with the actual data 823 being stored in an off-die memory 822. It should be noted, however, that the underlying principles of the invention are not limited to this specific implementation. For example, in some embodiments, both cache levels 810, 820 may store data and metadata on-die. Moreover, there may be additional layers of cache above L1 or below L2 that may, or may not participate in these embodiments. In this example, L1 cache 810 and L2 cache 820 have the same number of Sets, with identically-sized entries in each Set. However, the L1 cache 810 only holds four entries per Set whereas the L2 cache 820 holds ten entries per Set.

A requestor 802 (e.g., a thread executed by the processor 800), generates requests for specific cache lines, using a multi-bit address to identify the lines. One subset of the address bits may be treated by the cache as Set number, and a different subset of the address bits may be treated by the cache as a Tag. If the cache lines are stored in the L1 cache 810, then they are provided to the requestor 802. If not found in L1, then if the cache lines are stored in the L2 cache 820, then they are provided to the L1 cache 810 and requestor 802. If not, then they may be provided from main memory 830 to requestor 802 and also then cached in the L2 and L1 caches as described below.

FIG. 8 also shows example metadata for the L1 cache 811 and the L2 cache 821 comprising the Tags (i.e., address portions) and LRU values for a particular Set in the L1 cache 810 and the identically-numbered Set in the L2 cache (identified as Set n in the example). Ways 1, 5, 6, and 8 are marked in bold in FIG. 8 for the L2 Set as a visual indicator that these L2 Ways are currently also being cached by the L1 cache.

In this scheme, the lower the LRU number, the more recently the entry was requested. The L1 cache 810 and L2 cache 820 handle their LRUs independently. For example, looking at the LRU of the L1 cache 810, the processor 800 may have requested a string of addresses from this Set, culminating in those with Tag values 307, 242, 045, 378, 045 (in order, most recent shown last). Note that Tag 045 was requested multiple times and the LRU shown is a result of the most recent time it was requested.

Looking at the LRU values in the L2 cache, it can be seen that addresses with Tags 378 and 045 were requested fairly recently from the L2 (as they have low LRU numbers in L2). We can also see that Ways 2 and 4 (Tags 624 and 821) were more recently requested from L2 by L1 than Ways 6 and 8 (Tags 242 and 307). However, Tags 624 and 821 are not also in the L1 cache 810. This can be explained by Considering the CPU request sequence: 307, 479, 242, 023, 459, 307, 242, 343, 821, 624, 242, 307, 378, 307, 045, 307, 242, 045, 378, 045.

When time came to allocate L1 Ways for Tags 378 and 045 (underlined and bolded), the Tags for 821 and 624 (underlined) were the least recently used. This also explains why the Tags for 242 and 307 have such old LRU numbers in the L2 cache—they are so heavily used by the processor 800 that they have remained in the L1 cache for a long time since they were requested from the L2 cache. As far as the L2 cache is concerned, these entries have not been used for a long time.

Figure 9B:
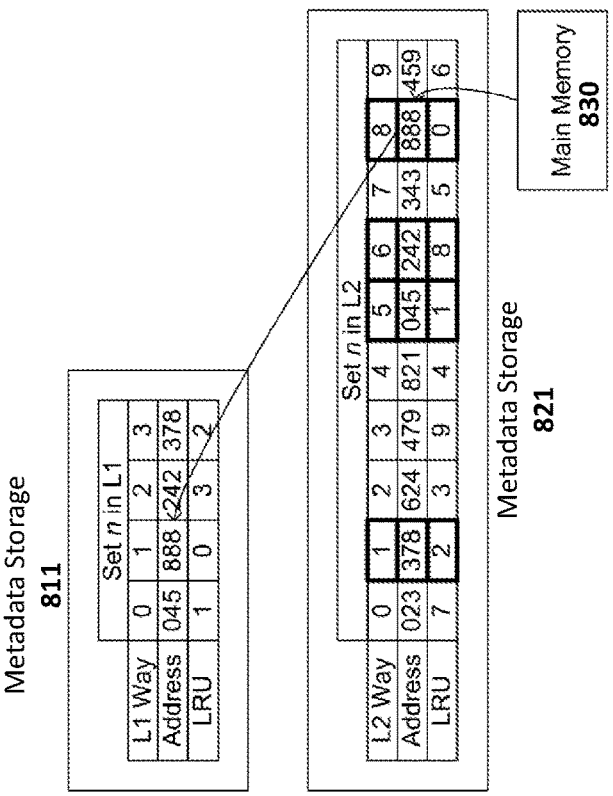
FIGS. 9A-B illustrate data maintained across the L1 and L2 caches when implementing a least recently used (LRU) eviction policy.
Figure 9A:
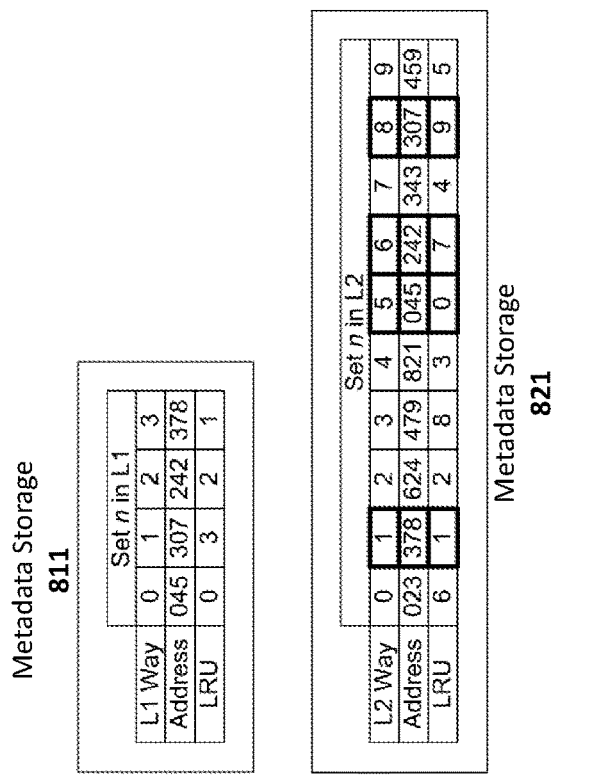

FIGS. 9A-B illustrate the problem that the embodiments of the invention are able to solve, showing before (9A) and after (9B) images for the Tag and LRU values in the Metadata 811, 821 for the two caches 810, 820 for the case where the processor 800 now requests an address whose Tag is 888 (which is found in neither L1 nor L2 cache). FIGS. 9A-B illustrate the extent of the problem of the L2 cache not being made aware of actual processor address usage.

In a typical scheme, the L2 cache 820 will fetch the data for the address with Tag 888 from main memory 830, place it into L2 cache 820, and deliver it to the L1 cache 810. The L2 cache 820 has to evict an entry in order to make room for the new entry with Tag 888, and in the illustrated example, the L2 cache 820 will choose to evict entry 8 which has the highest LRU value of 9, throwing the entry with Tag 307 out of the cache. The L2 cache 820 is not aware that the address with Tag 307 has been recently used by the processor 800, as it saw no recent request from L1 cache 810 with that Tag value. We thus have an example (in this case transient) of a case where an entry is held in L1 cache, but not held in L2 cache.

In this case, the cache line with Tag 307 is also evicted from the L1 cache 810 (depending on its LRU in L1 this could also occur during a subsequent request, in which case this will be a non-transient case where an entry is held in L1 cache, but not held in L2 cache). Should processor 800 need to reaccess that address a short time later, it will not find the address with Tag 307 in the L1 cache 810 nor in the L2 cache 820. Thus, the fourth least-recently-used entry of this system is not held in any cache, even though there are enough Ways available in L2 cache to hold the ten least-recently-used entries.

Figure 10:
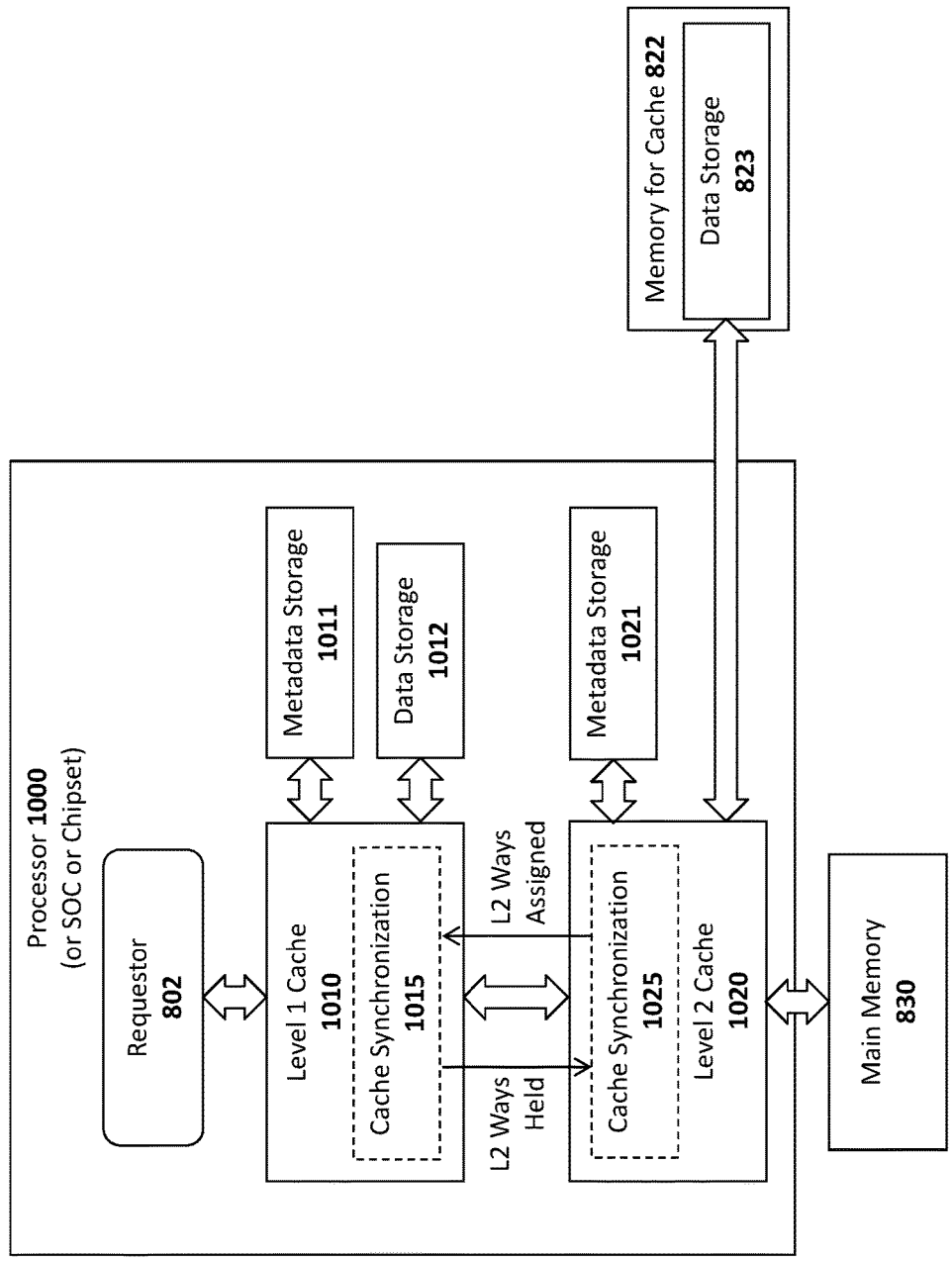
FIG. 10 illustrates one embodiment in which intercommunication of data between the L2 and L1 ensures that certain lines of data are not evicted from the L2.
Figure 11:
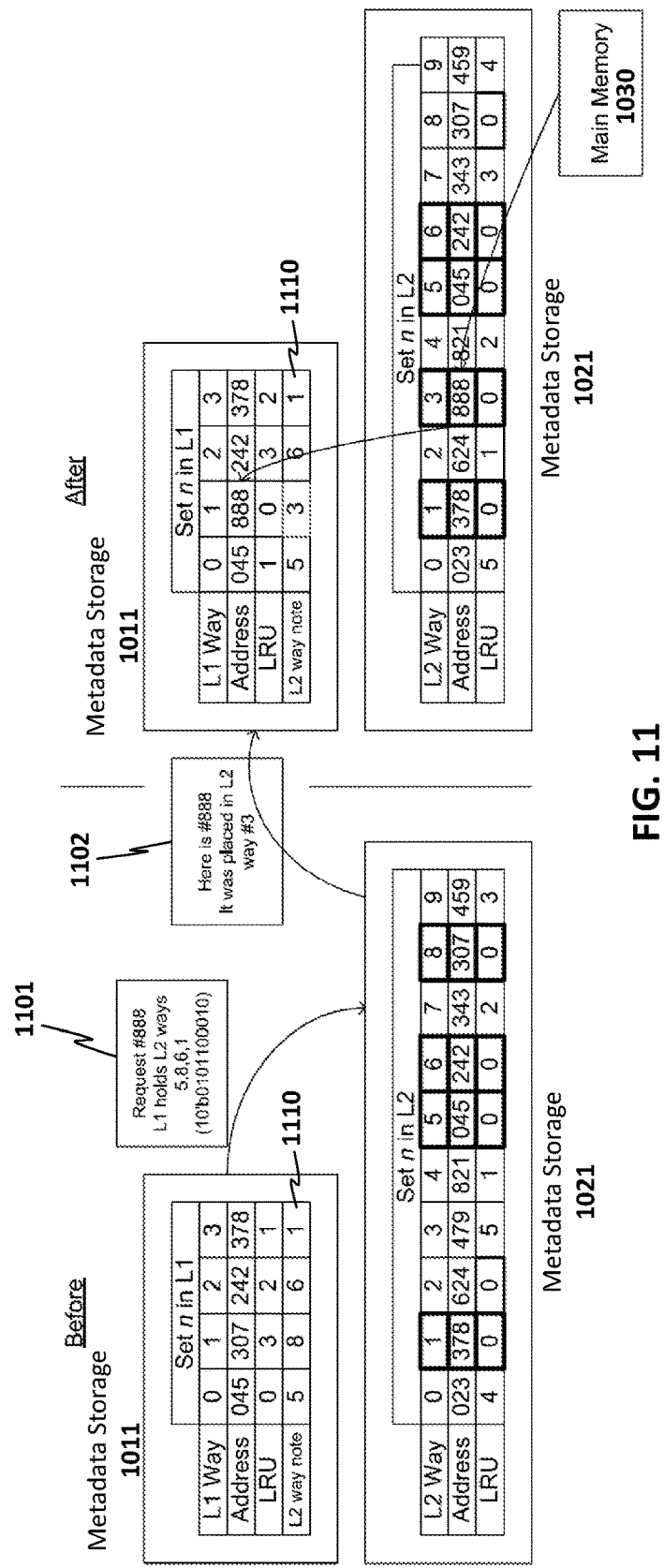
FIG. 11 illustrates one embodiment in which certain LRU values within the L2 cache are set to a minimum value to ensure that the data is not evicted.

One embodiment of the invention which addresses this problem will be described with respect to FIGS. 10-11. In particular, as illustrated in FIG. 10, cache synchronization circuitry 1025 of the L2 cache 1020 communicates the L2 Ways associated with lines assigned to the L1 cache 1010 and cache synchronization circuitry 1015 of the L1 cache 1010 communicates details of the Ways of L2 cache that are also currently held in the L1 cache 1010 whenever it sends a request to the L2 cache. In order to be able to do this, the L1 cache 1010 is enhanced to maintain additional Metadata 1011, as illustrated in FIG. 11, that stores the Ways in the L2 cache 1020 used for each entry, and this is held for all entries in the L1 cache 1010 (identified as the "L2 Way note" 1110 for each entry). In one embodiment, this indication is provided by the cache synchronization circuitry 1025 of the L2 cache 1020 to the L1 cache 1010 as additional Metadata when delivering a response to an L1 cache request, all of which are served either from the L2 cache or from main memory 830 via a new allocation to the L2 cache 1020.

A related part of this embodiment is that the L2 cache 1020 does not re-allocate those Ways until it is informed that the Ways are no longer in the L1 cache 1010. As mentioned above, in one embodiment, when requesting data from L2 cache 1020, the cache synchronization circuitry 1015 of the L1 cache 1010 notifies the L2 cache of the L2 Ways that it is holding for that L2 Set. The Set numberings may be identical or closely related. This is negligible additional effort for the L1 cache 1010 which, in any case, will have accessed its Metadata 1011 for the entire Set due to having searched for a possible L1 hit.

This alone is enough for the L2 cache to avoid allocating any of these L2 Ways for new data should the request from L2 result in a fetch from main memory. However, it does not allow the L2 to track the true overall "Least Recently Used" status. Consequently, in one embodiment, the LRU calculation circuitry (not shown) of the L2 cache 1020 considers all Ways which are also held in the L1 cache as "Super Most Recently Used" and sets an LRU value of zero for these Ways, as illustrated in FIG. 11. This ensures that these Ways will not be evicted in response to the L2 cache 1020 retrieving a cache line from memory 830. However, once one of these cache lines has been evicted from the L1 cache 1010, the L2 cache will be notified by the cache synchronization circuitry 1015 of the L1 cache (which will provide an indication of the current Ways, which will no longer include the Way for this cache line). The L2 cache will then increase the LRU value to 1 and start aging the cache line as usual (i.e., increasing the LRU value).

This is illustrated with an example in FIG. 11 in which a request 1101 for Tag 888 is sent from the L1 cache to the L2 cache. The request includes an indication of the Ways currently stored in the L1 cache—Ways 5, 8, 6, and 1. As a result of receiving this information from the cache synchronization circuitry 1025, the LRU calculation circuitry in the L2 cache (not shown) sets the LRU value for these Ways to the Super Most Recently Used value of 0 (as indicated by the bolded boxes around these Ways). Note that Way 2 initially also has an LRU value of 0 in the L2 cache, presumably because it was in the L1 cache the last time the L1 cache made a request. The cache line identified by Tag 888 is retrieved from main memory 1030 and stored in the L2 cache in place of the entry in L2 Way 3 which had the highest LRU value of 5. The entry identified by Tag 888 is then provided to the L1 cache as indicated at 1102 and the cache synchronization logic of the L2 cache communicates the Way in which the entry has been stored—Way 3 in the example. The L1 cache implements its own LRU policy to replace the existing entry in L1 Way 1 (Tag 307) with the new entry (Tag 888). Note that at this stage, the L2 cache may not be aware of which entry was replaced in the L1 cache (unless the L1 cache communicates its LRU values to the L2 cache). However, the next time the L1 cache makes a request, it will be provide the L2 cache the L2 Way notes as described above, and the L2 will set these entries to the Super Most Recently Used values as described above.

As can be seen in FIG. 11, the highest (i.e., oldest) value of LRU in L2 is now the value of 5 for Way 3, which has Tag of 479, and is truly the Least Recently Used in the sequence shown earlier: 307, 479, 242, 023, 459, 307, 242, 343, 821, 624, 242, 307, 378, 307, 045, 307, 242, 045, 378, 045.

Thus, by maintaining the "Super MRU" indication (e.g., an LRU value of 0) for all these entries in the L2 cache, these entries are prevented from prematurely ageing in the L2 cache. As a result, the problem cases where caches evict an entry that was fairly recently accessed by the processor are removed.

In one embodiment, the cache synchronization circuitry 1015 of the L1 cache 1010 indicates to the L2 cache which L2 cache Ways it is holding with a bitwise vector that may be sent over a bus having a width equal to the number of Ways in each L2 cache Set (e.g., ten bits in the illustrated example). The cache synchronization circuitry 1025 of the L2 cache must then, on delivering data to the L1 cache, indicate which Way is being used in L2 to hold that data. In one embodiment, this is implemented using a smaller bus capable of holding the value of the Way being used by L2. For example, with ten Ways in the L2 cache 1020, a 4-bit bus may be used. In neither direction is there a requirement to indicate the Set number being used, as this is implicit in the address of the request which was sent from the L1 cache 1010 to the L2 cache 1020.

Figure 12:
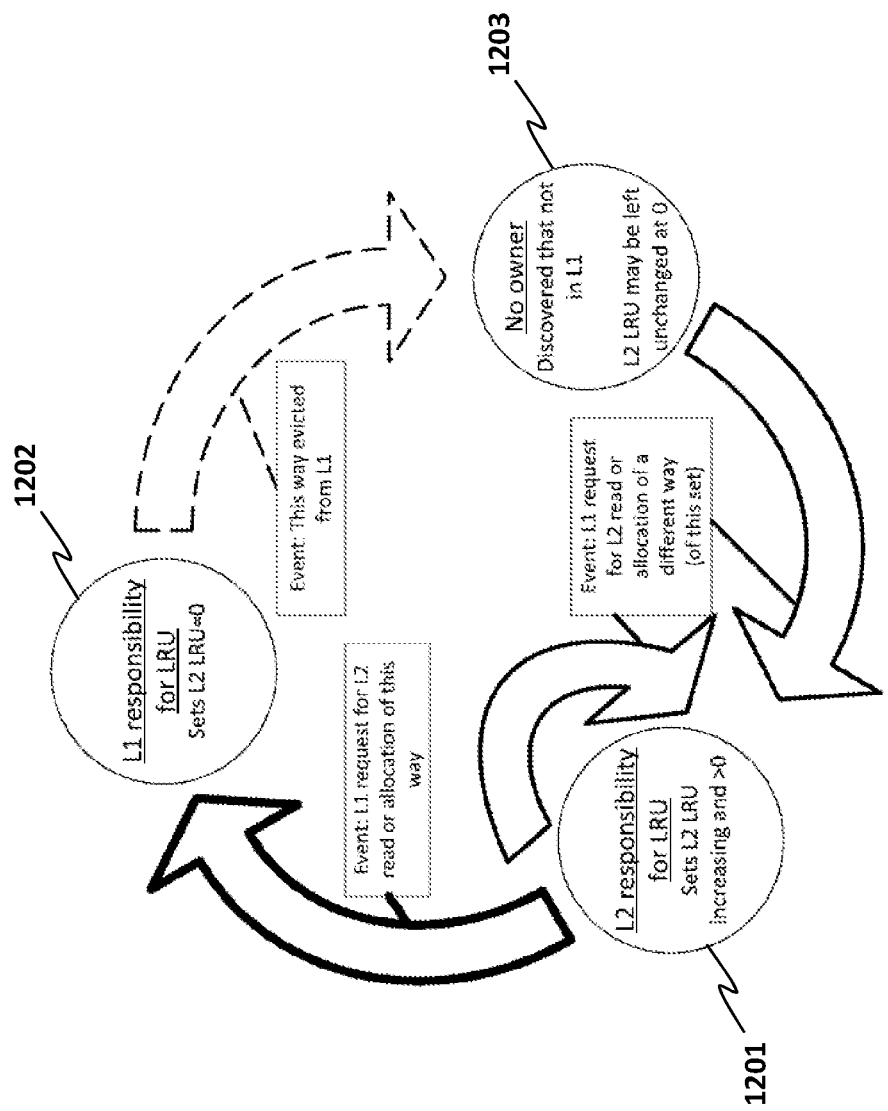
FIG. 12 illustrates a process in accordance with one embodiment of the invention.

FIG. 12 shows a flow diagram illustrating the change of ownership of LRU between the L1 cache and the L2 cache for a single entry (Way) in a Set. At 1201, the L2 cache has responsibility for the LRU value, increasing the LRU values in each iteration for those entries which have not been accessed. Once data for the entry is delivered by the L2 cache to the L1 cache (indicated by the bold arrow), the LRU for that entry is now "owned" by L1 at 1202. The L2 cache zeros its own LRU record for that Way (to provide the "Super MRU" indication) and the LRU is then tracked by the L1 cache. In one embodiment, the L2 LRU algorithm does not increment the LRU for any such "Super MRU" Ways as described above. This condition continues for as long as that entry remains in the L1 cache.

When the entry becomes the Least Recently Used of the L1 entries for that Set is evicted from L1 (such as when that Way of L1 is reallocated, or if that entry is evicted from L1 for other reason such as a request by processor 800 to invalidate that data in the L1 cache), the L1 abdicates ownership of the LRU (indicated by the dashed arrow), and will no longer indicate that Way in any vector sent to the L2 cache. However, it must be noted that the dashed arrow itself does not indicate that any such vector is sent at this point. Thus, the L1 cache no longer has ownership of the LRU, but the L2 cache is unaware of this (and believes that the L1 cache still has ownership), so it may be considered that the LRU has no owner at 1203. This is typically a short-term state.

At some point, the L1 cache may request data from the L2 cache using an address from the Set (this may occur immediately if the eviction from L1 was to allow reallocation, in anticipation of requesting data for this address from L2). Included with the request may be a vector sent to the L2 cache indicating the Ways of L2 cache held in the L1 cache, and, as described, this will not include the L2 Way indication that was held by the re-allocated L1 entry.

Once the L2 cache accesses the Set to allocate or return a different entry for the Set, it will assign an LRU value of "1" to the entry for which the L1 abdicated ownership (i.e., being the lowest non-zero value) and allow that entry's LRU to increment every time the Set is accessed and that entry is not a "hit". Note that normally, the L2 cache will never return the entry that has just moved to "no owner", as this case would have resulted in a L1 cache hit to that entry, however, in some cases such as after L1 cache flush, this may occur.

While the embodiments of the invention are discussed above in the context of an "L1" cache and "L2" cache, the underlying principles of the invention are applicable to any particular set of cache levels. They may also be applied in recursive and in holistic manner to more than two levels of cache. For example, the L1 cache may hold both L2 Way and L3 Way numbers (e.g., having been advised of the L3 Way number by the L2 cache).

Figure 13:
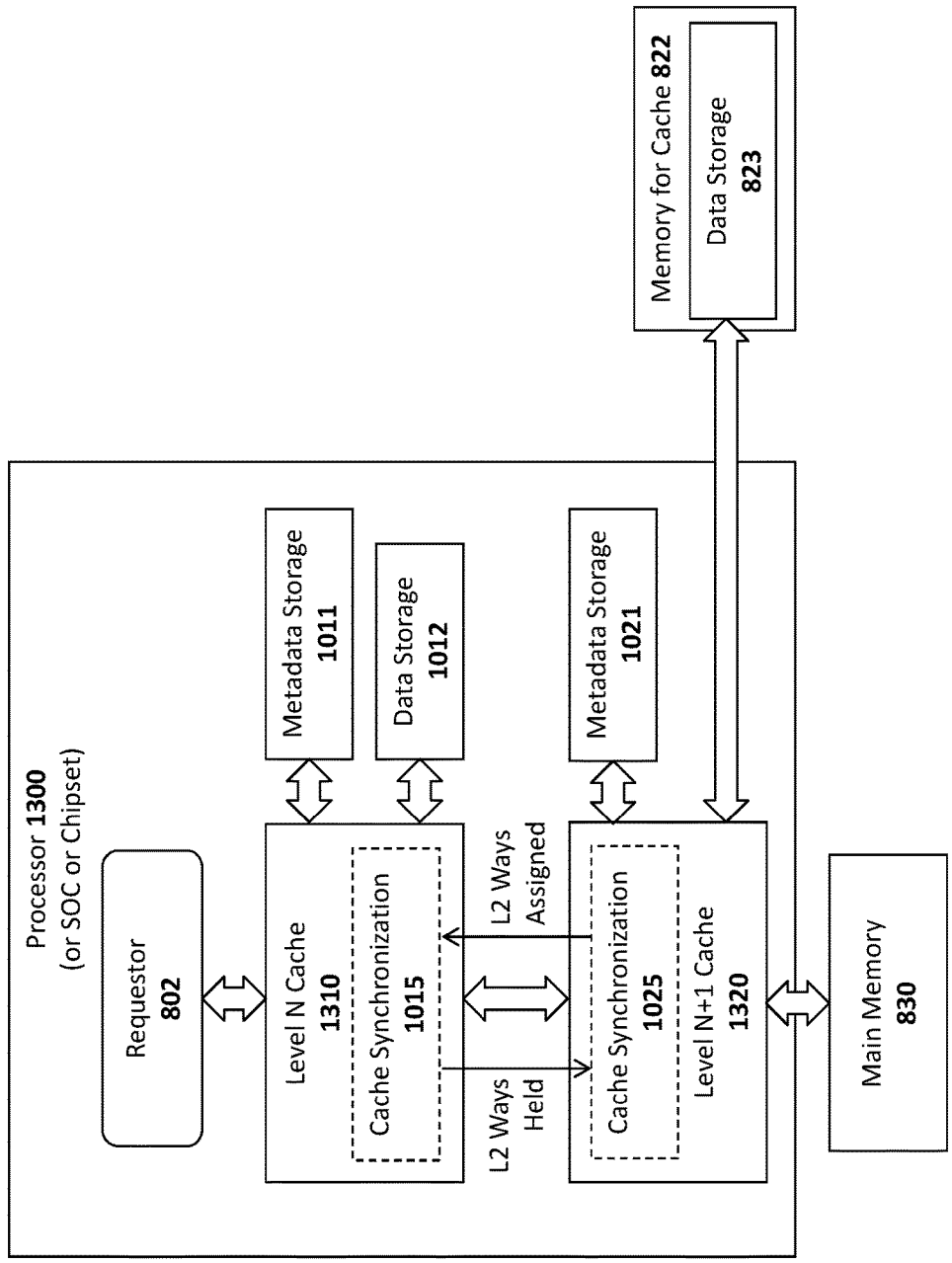
FIG. 13 illustrates one embodiment in which intercommunication of data between a Level N cache and a Level N+1 cache ensures that certain lines of data are not evicted from the Level N+1 cache.

One embodiment is illustrated in FIG. 13 as a Level N cache 1310 and Level N+1 cache 1320. For example, the Level N+1 cache may be a Level 3 cache and the Level N cache may be a Level 2 cache. Alternatively, the Level N+1 cache may be a system DRAM and the Level N cache may be an internal cache subsystem of the processor 1300. In other words, the two cache levels shown may be any two adjacent levels in a memory or cache hierarchy.

In addition, the embodiments of the invention described herein may be implemented within a computer system which utilizes a two-level memory (2LM) subsystem. The assignee of the present application, for example, has designed a 2LM memory subsystem in which a non-volatile memory (such as phase change memory and switch (PCMS)) is used as a "far memory" in combination with a volatile memory such as DRAM used as a "near memory" to improve performance in the 2LM hierarchy. The "near memory" in this configuration is logically closer to the processor and sometimes referred to as a memory side cache (MSC). In one embodiment, the Level N cache 1310 comprises any cache memory internal to the processor 1300 and the Level N+1 cache 1320 comprises a DRAM used as near memory within the memory hierarchy.

In one embodiment, the number of L2 cache Sets is different from the number of Sets of the L1 cache. For example, the number of L2 cache sets may be an integer multiple or a non-integer multiple of the number of L1 cache sets. In this embodiment, cache synchronization logic 1015 of the L1 cache has knowledge of the multiple, and only marks bits in the vector if they are relevant to the L2 cache Set that will be handling the request. In this way, entries may be evicted from the L1 cache without being replaced in the L1 cache by an entry from the same L2 Set. The "no owner" situation described above with respect to FIG. 12 may occur for a longer period, and multiple Ways may transition from "No owner" 1203 to "increasing L2 LRU" 1201 at the same time. In some cases, the L2 cache may also be asked for (and return) one of these entries. However, in this scheme there is no requirement for uniqueness in the L2 LRU values and the overall required behavior still holds.

As previously described, when an LRU value of 0 is assigned to an entry in the L2 cache, it is considered "Super Most Recently Used" and is not expected to be re-allocated. However, in some cases (for example, if all other cache entries are considered 'dirty'), it may be desirable to re-allocate such an entry, despite its "Super Most Recently Used" status. In some embodiments, a mechanism may be provided whereby the L2 cache can request that the L1 cache relinquish ownership of its entries (for example a specified or non-specified subset of such entries) and in order that the L2 cache may take ownership of the LRU of those entries. The relinquish process may be effected, for example, by the L1 cache evicting those entries. A handshake may be included such that the L2 cache may wait for confirmation of L1 relinquishment prior to considering the entry to no longer be "Super Most Recently Used".

Some cache embodiments maintain a proportion of Metadata (e.g., 4 Ways per Set) on-die and the full set of Metadata (e.g., ten Ways per Set) in slower off die structures. Other embodiments maintain a proportion of Metadata (e.g., 4 Ways per Set) on-die and the remainder of Metadata (e.g., a further six Ways per Set) in slower off die structures. For the purposes of the embodiments of the invention, either such embodiment may be considered equivalent to a two-level cache where the main data storage (not Metadata) is in a shared structure.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a level N cache configured to store a first plurality of entries; and
a level N+1 cache configured to store a second plurality of entries;
the level N+1 cache configured to associate a first value with an entry upon receiving a request for the entry from the level N cache at which time the entry is to be copied from the level N+1 cache to the level N cache, the request configured to indicate Level N+1 cache entries currently stored in the level N cache, the first value configured to indicate that the entry is not to be aged in accordance with a Least Recently Used (LRU) policy implemented by the level N+1 cache, the level N+1 cache configured to maintain the first value until the entry is evicted from the level N cache, the level N+1 cache configured to associate the first value with entries within the level N+1 cache corresponding to the currently stored entries in the level N cache,
wherein after being notified that the entry has been evicted from the level N cache, the level N+1 cache is configured to associate a second value with the entry, the second value configured to indicate that the entry is to begin aging in accordance with the LRU policy implemented by the level N+1 cache.

2. The apparatus as in claim 1 wherein the level N cache comprises a CPU cache and wherein the level N+1 cache comprises a memory-side cache.

3. The apparatus as in claim 1 wherein the first value comprises a first LRU value to indicate which is to be maintained by the level N+1 cache until being notified that the entry has been evicted from the level N cache.

4. The apparatus as in claim 3 wherein the first value comprises a Super Most Recently Used value.

5. The apparatus as in claim 4 wherein the second value comprises a second LRU value to indicate the entry is the Most Recently Used of all other entries in the level N+1 cache except for any entries having Super Most Recently Used values.

6. The apparatus as in claim 5 wherein the level N cache is to apply its own LRU policy with respect to its own entries, thereby ageing and evicting entries in accordance with its own LRU policy.

7. An apparatus comprising:
a level N cache configured to store a first plurality of entries;
a level N+1 cache configured to store a second plurality of entries in a plurality of level N+1 cache Ways, the level N+1 cache configured to provide an entry to the level N cache upon receiving a request for the entry from the level N cache;
level N+1 cache synchronization logic configured to provide to the level N cache an indication of a level N+1 cache Way in the level N+1 cache in which the entry provided to the level N cache is stored, the level N cache configured to track the level N+1 cache Ways associated with each entry; and
level N cache synchronization logic configured to provide an indication to the level N+1 cache synchronization logic of the level N+1 cache Ways for which it currently has stored entries when making a request for one or more cache entries from the level N+1 cache, the level N+1 cache configured to perform evictions of entries based on the indication provided by the level N cache.

8. The apparatus as in claim 7 wherein the level N cache comprises a CPU cache and wherein the level N+1 cache comprises a memory-side cache.

9. The apparatus as in claim 7 wherein to perform evictions of entries based on the indication provided by the level N cache, the level N+1 cache is to implement a Least Recently Used (LRU) policy in which entries which are indicated to be the stored in the level N cache are assigned a value indicating that these entries are Super Most Recently Used (SMRU).

10. The apparatus as in claim 9 wherein the level N+1 cache is to refrain from modifying LRU values associated with the entries indicated to be in the level N cache until the level N cache synchronization logic provides an indication that one or more of these entries are no longer in the level N cache.

11. The apparatus as in claim 10 wherein upon receiving the indication that one or more of these entries are no longer in the level N cache, the level N+1 cache is to begin applying the LRU policy to these entries, thereby ageing and evicting entries in accordance with the LRU policy.

12. The apparatus as in claim 11 wherein the level N cache is to apply its own LRU policy with respect to its own entries, thereby ageing and evicting entries in accordance with its own LRU policy.

13. The apparatus as in claim 7 wherein the level N cache synchronization logic includes a first bus having a width equal to a number of Ways in each level N+1 cache Set, the level N cache synchronizing logic to use the first bus to communicate the indication of the level N+1 cache Ways for which it currently has stored entries in the form of a bit vector transmitted over the first bus.

14. The apparatus as in claim 13 wherein the level N+1 cache synchronization logic includes a second bus having a width of N where $2^N$ is greater than or equal to the number of Ways in the level N+1 cache, the level N+1 cache synchronization logic to use the second bus to communicate the indication of the level N+1 cache Way in the level N+1 cache in which the entry provided to the level N cache is stored.

15. The apparatus as in claim 13 wherein the level N+1 cache is organized into a plurality of Sets, each Set comprising the plurality of level N+1 cache Ways, wherein the number of level N+1 cache Sets is a multiple of the Sets of the level N cache, wherein the level N cache synchronization logic is aware of the multiple and only marks bits in the bit vector if they are relevant to the level N+1 cache Set responsible for handling each request.

16. The apparatus as in claim 7 wherein the level N cache includes a metadata component and a data component, both the metadata component and the data component stored on a common semiconductor die, and wherein the level N+1 cache also includes a metadata component and a data component, wherein at least a first portion of the metadata component of the level N+1 cache is stored on the common semiconductor die and wherein the data component is stored off of the common semiconductor die.

17. The apparatus as in claim 16 wherein a second portion of the metadata component of the level N+1 cache is stored off of the common semiconductor die.

18. A method comprising:
storing a first plurality of entries in a level N cache;
storing a second plurality of entries in a level N+1 cache within a plurality of level N+1 cache Ways;
providing an entry from the level N+1 cache to the level N cache upon receiving a request for the entry from the level N cache;
providing to the level N cache an indication of a level N+1 cache Way in the level N+1 cache in which the entry provided to the level N cache is stored, the level N cache to track the level N+1 cache Ways associated with each entry;
providing an indication to the level N+1 cache of the level N+1 cache Ways for which the level N cache currently has stored entries when making a request for one or more cache entries from the level N+1 cache; and
performing evictions of entries in the level N+1 cache at least partially based on the indication provided by the level N cache.

19. The method as in claim 18 wherein the level N cache comprises a Level 1 (L1) cache and wherein the level N+1 cache comprises a Level 2 (L2) cache.

20. The method as in claim 18 wherein performing evictions of entries based on the indication provided by the level N cache comprises:
implementing a first Least Recently Used (LRU) policy in which entries which are indicated to be the stored in the level N cache are assigned a value indicating that these entries are Super Most Recently Used (SMRU).

21. The method as in claim 20 further comprising:
refraining from modifying LRU values associated with the entries indicated to be in the level N cache until an indication that one or more of these entries are no longer in the level N cache is provided.

22. The method as in claim 21 wherein upon receiving the indication that one or more of these entries are no longer in the level N cache, applying the LRU policy to these entries, thereby ageing and evicting entries in accordance with the LRU policy.

23. The method as in claim 22 further comprising:
applying a level N cache LRU policy with respect to the entries in the level N cache, thereby ageing and evicting entries in accordance with a level N cache LRU policy.

24. The method as in claim 18 further comprising:
transmitting the indication of the level N+1 cache Ways for which the level N cache currently has stored entries in the form of a bit vector transmitted over a first bus from the level N cache to the level N+1 cache, the first bus having a width equal to a number of Ways in each level N+1 cache Set.

25. The method as in claim 24 further comprising:
transmitting the indication of the level N+1 cache Way in the level N+1 cache in which the entry provided to the level N cache is stored over a second bus having a width of N where $2^N$ is greater than or equal to the number of Ways in the level N+1 cache.

* * * * *